No. 1,170. S. PARSONS. PATENTED JUNE 7, 1839.
ANTIFRICTION WASHER.
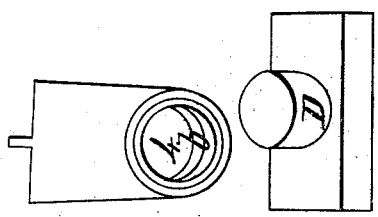
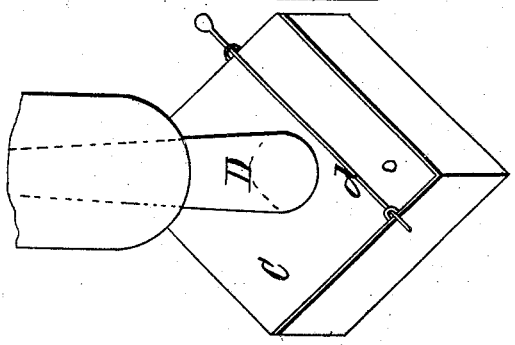
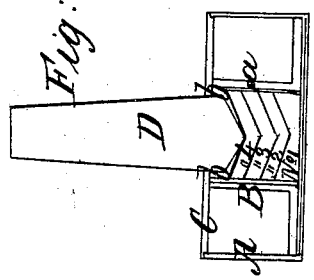
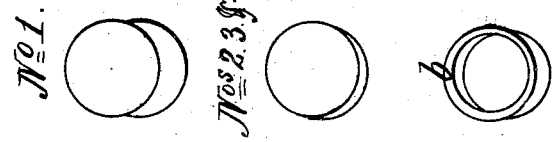
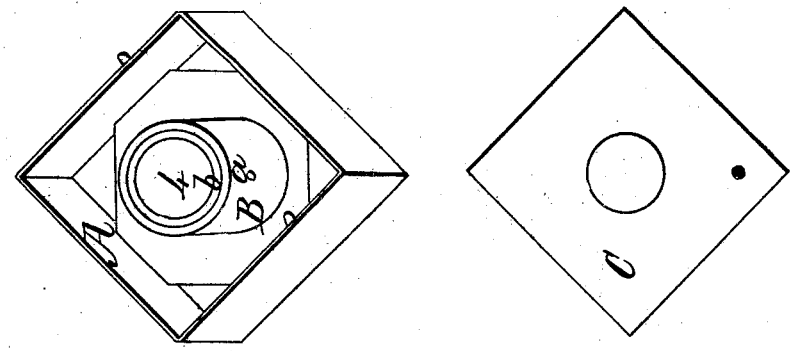

UNITED STATES PATENT OFFICE.

STEPHEN PARSONS, OF EDGECOMB, MAINE.

MODE OF PREVENTING FRICTION AND ADHESION IN THE STEPS OR GUDGEONS OF VERTICAL SHAFTS AND SPINDLES.

Specification of Letters Patent No. 1,170, dated June 7, 1839.

*To all whom it may concern:*

Be it known that I, STEPHEN PARSONS, of Edgecomb, in the county of Lincoln and State of Maine, have invented a new and improved mode of preventing by a constant change of the place of motion the cohesive adhesion caused by friction and so well known to exist under the foot of any perpendicular shaft, or spindle while revolving under a heavy pressure; and I do hereby declare that the following is a full and exact description of the same, reference being had to the accompanying drawings, making part of this specification.

The nature of my invention consists in providing a set of anti-friction washers of a particular construction, placing them under and around the end of a perpendicular shaft, spindle or pivot of a shaft, or when the nature of the case requires it, I reverse this order, and place said washers in the end of the shaft or gudgeon.

To enable others to make and use my invention I will proceed to describe its construction and operation.

I procure a cast iron box of a required size, (for a common grist mill say five inches square on the inside,) Figure 1, A for what is commonly called the ink. I then provide another box B, made of steel, cast iron or any hard metal, about three inches in diameter and $2\frac{1}{4}$ inches high, having a basement rim, say eight square, that will fit into box A. Said box B, must have a round hole through it, say $1\frac{1}{2}$ inches diameter, with a groove made in one side from top to bottom, and a hole $a$, through the outside, to admit oil from the ink to the washers. I then provide washer No. 1, of the same diameter as the hole in box B, and about $\frac{5}{8}$ of an inch in thickness, concave on one side and flat on the other to set in the bottom of the hole in box B, for the lower washer. I then provide washers 2, 3, 4, &c. of the same diameter and about $\frac{3}{8}$ of an inch thick, convex on the lower side so as to suit the concavity in washer No. 1, and concave on the upper side to receive each the next or succeeding washer, somewhat thinner at their edges, so as to move easily. I then insert said washers 2, 3, &c., on washer No. 1, in box B. I then provide a ring washer $b$, about $\frac{1}{2}$ of an inch deep, and $\frac{1}{4}$ of an inch in thickness, that will turn easily in the hole in box B, on top of the conic washers, 1, 2, 3, &c. to check any tendency to lateral motion. I then cover the ink with a plate C, made so as to keep box B firm, and the ring washer $b$, from rising. Said plate C must have a hole through it to receive the step of the spindle D, Fig. 2. Plate C is fastened by a pin $d$. When said washers are to be used under water, I provide a gudgeon, Fig. 3, with a suitable hole in the end to receive said washers, and fasten them in by placing a ring on them, and pinning it to said gudgeon, and have them run upon a step D, firmly fixed in the foundation, &c. Said washers are inverted in the end of the shaft, hence sand and other dirt will not get between them—and when said washers, are made of steel they require a spring temper which will produce the desired effect.

Fig. 4 shows the form of the washers, and the general arrangement, in section.

What I claim as my invention, and desire to secure by Letters Patent is—

The employment of washers, to steps or gudgeons of vertical shafts, and spindles, to prevent friction and adhesion, constructed substantially as above described.

STEPHEN PARSONS.

Witnesses:
 ORRIN HOLT,
 B. B. CARY.